Nov. 12, 1968 D. J. POITRAS 3,411,061

FAST CRITICALLY DAMPED MOTOR DRIVE SYSTEM

Filed Aug. 20, 1965 3 Sheets-Sheet 1

INVENTOR.
DONALD J. POITRAS
BY John V. Regan
ATTORNEY

FAST CRITICALLY DAMPED MOTOR DRIVE SYSTEM

Filed Aug. 20, 1965 3 Sheets-Sheet 2

INVENTOR.
DONALD J. POITRAS
BY John V. Regan
ATTORNEY

| 81 | 82 | 83 | 84 |
|---|---|---|---|
| H | H | H | L |
| L | H | H | H |
| L | L | H | H |
| L | L | L | H |
| L | H | L | H |
| H | L | H | H |
| H | L | L | H |
FIG. 4
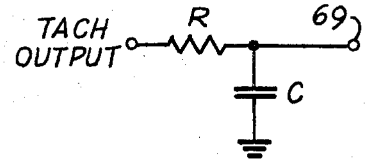
FIG. 5
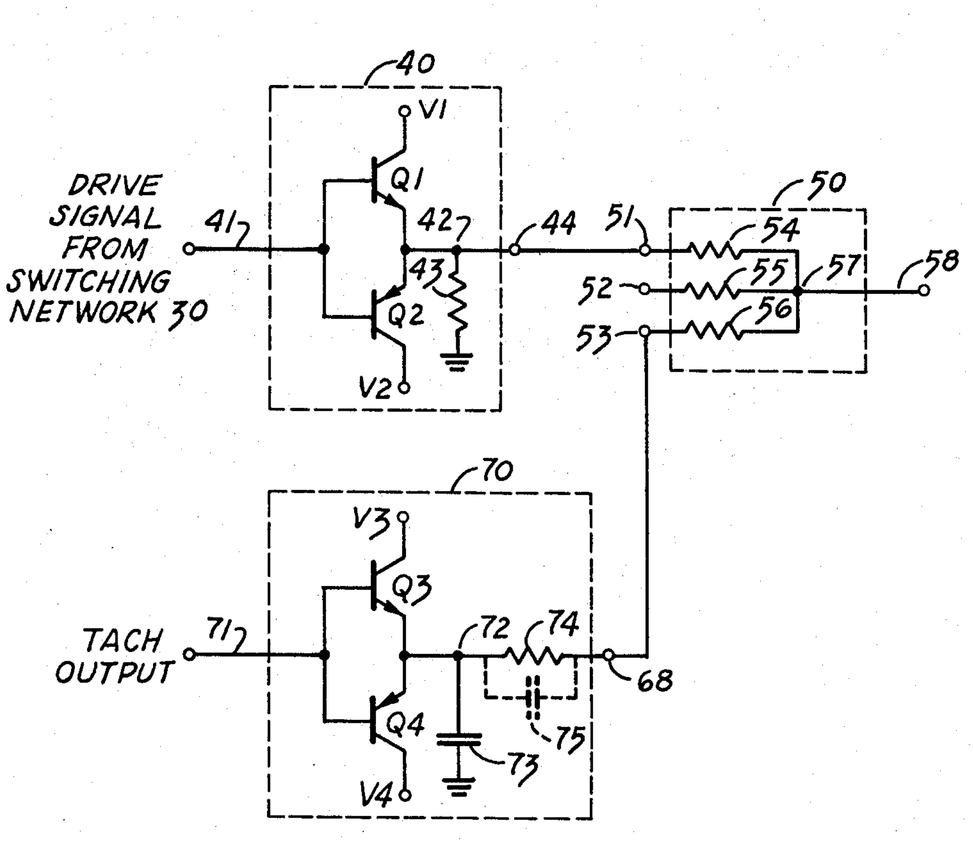
FIG. 6
INVENTOR.
DONALD J. POITRAS
BY John V. Regan
ATTORNEY United States Patent Office 3,411,061
Patented Nov. 12, 1968

3,411,061
FAST CRITICALLY DAMPED MOTOR DRIVE SYSTEM

Donald J. Poitras, Haddonfield, N.J., assignor to Radio Corporation of America, a corporation of Delaware Filed Aug. 20, 1965, Ser. No. 481,278
16 Claims. (Cl. 318—326)

ABSTRACT OF THE DISCLOSURE

Tape station motor feedback and drive arrangement for fast, critically damped turn-on and turn-off transients and for fast reversal transients. A switching circuit responds to the motor drive command signals to connect a dynamic filter having a small lag into the feedback loop during the turn-on and reversal transients and to connect a relatively larger lag network into the feedback circuit during the turn-off time. The dynamic filter reduces the effective output resistance of the tachometer by the betas of the complementary transistors Q3 and Q4 (FIG. 6) thereby reducing the time constant of the filter. Transistors Q1 and Q2 (FIG. 6) constitute a temperature sensitive network to compensate for variations of the betas of the transistors Q3 and Q4 with temperature.

This invention relates to data processing equipment and more particularly to a system for controlling the turn-on, turn-off and reversal transients of a drive arrangement for a magnetic tape station.

In general, magnetic tape stations include a pair of reels upon which a magnetic tape is wound and between which the tape is reeled by a tape drive arrangement past a magnetic recording head. In one type of tape drive arrangement, a printed circuit type D.C. motor drives a capstan, the surface of which is in frictional contact with the magnetic tape so that when the capstan rotates, the tape is translated between the reels and past the magnetic recording head. The tape drive arrangement must be capable of rapidly accelerating and decelerating the tape in accordance with the demands of the central processor or computer with which the tape station is associated. These demands may call for random turn-on, turn-off and reversal operations at rates of occurrence up to fifty operations per second for periods as long as twenty-four hours and at even higher rates for shorter periods of time. Such rigorous operational requirements demonstrate the need not only for rapid acceleration and deceleration of the D.C. motor drive arrangement but also the need for low power dissipation in the D.C. motor.

When the magnetic tape is to be accelerated from rest to steady state speed in either the forward or the reverse direction, the motor drive arrangement provides an overdrive signal for rapidly accelerating the motor. It is desirable to terminate this overdrive signal at a predetermined time so that the motor attains its steady state speed with a substantially critically damped response in a minimum time. In order to achieve this objective, the phase lag in the feedback loop should be minimized or a phase lead should be introduced into the feedback loop during this turn-on transient. On the other hand, when the motor is returning to the rest condition from steady state speed in either direction, a time delay or phase lag is necessary in order to overcome dead zones in the drive arrangement and thereby supply power to the motor for longer periods of time. Moreover, where loading effects for motor rotation in one direction differ from loading effects in the other direction, different time delays or phase lags improve the return to zero transients. In many prior art control systems, the same phase lag and lead networks are continuously connected in the motor control circuit loop.

Motor feedback loops often include a tachometer coupled to the output shaft of the motor for developing a voltage which is directly proportional to the velocity of the motor. Due to the arrangement of brushes and commutator segments on the tachometer, the velocity voltage has an undesirable ripple component also proportional to the speed of the tachometer or motor. In prior art control systems, it is customary to minimize the ripple component by using passive filter networks. Passive filter networks introduce time delay into the motor feedback loop which is undesirable when a substantially critically damped response is desired in a minimum time.

It is an object of this invention to provide an improved drive arrangement for a magnetic tape station.

It is another object of this invention to provide different time delays in a motor drive arrangement for the turn-on and turn-off transients of the motor.

It is a further object of this invention to provide an improved filter network in a motor feedback circuit of a magnetic tape drive arrangement.

Briefly stated, the invention provides a switching circuit in combination with a source of command signals and a reversible D.C. motor control arrangement having a feedback circuit including first and second lag networks. The switching circuit includes a gating means responsive to the command signals for inhibiting the operation of the first lag network when the motor accelerates and for inhibiting the operation of the second lag network when the motor decelerates to a rest condition. The second lag network has a relatively short time constant, thus enabling the motor to attain a steady state speed with a substantially critically damped response in a short time. The first lag network has a relatively long time constant thus enabling the motor control arrangement to overcome dead zones therein in order to supply power to the motor longer during deceleration of the motor.

The feedback circuit includes a tachometer for developing a signal proportional to the motor velocity. The tachometer signal has an undesirable ripple component. The second lag network is in the form of a dynamic filter for filtering the A.C. ripple component from the velocity signal. The dynamic filter includes a transistor circuit arrangement which minimizes the charging time of the filter capacitance thereby providing a relatively short time constant. A temperature sensitive means is also provided to compensate for changes due to temperature variations in the current amplification factors of the dynamic filter transistors.

In the accompanying drawings:

FIG. 4 is a truth table of the gating means of the system of FIG. 2;

FIG. 5 is an example of a lag network which may be used in the system illustrated in FIG. 2; and FIG. 6 is a circuit diagram of a dynamic filter and temperature sensitive network of the system illustrated in FIG. 2.

Figure 1:
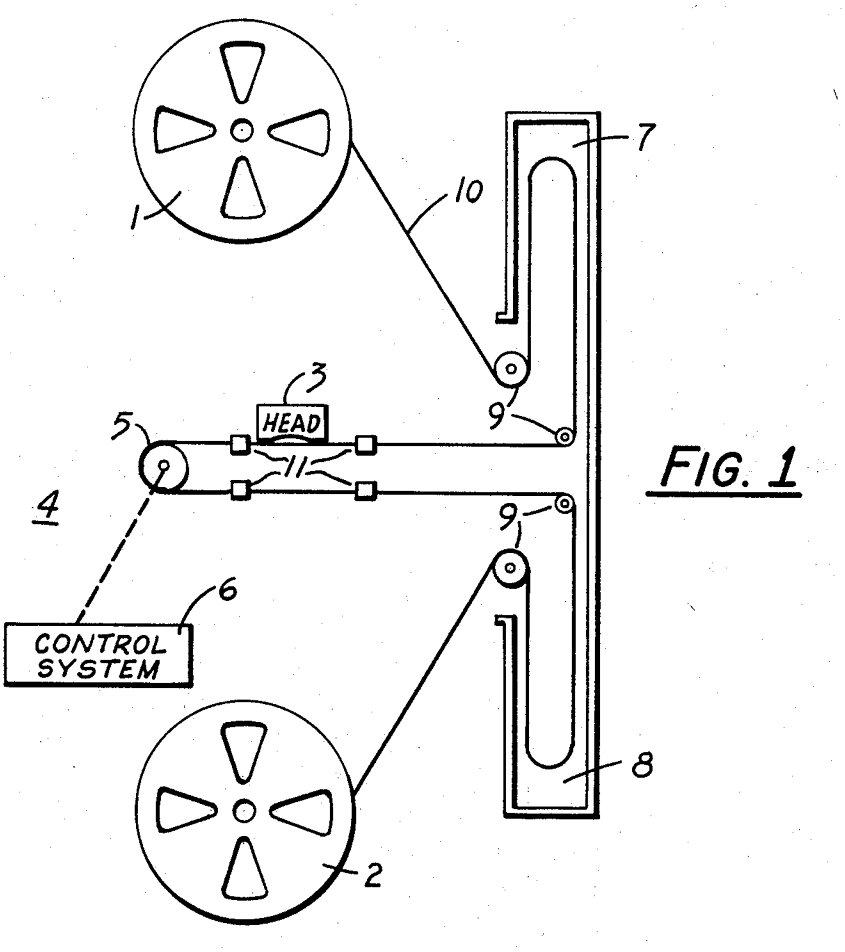
FIG. 1 is a partial diagram of a tape station environment in which the invention may be utilized.

Referring now to FIG. 1, a tape station with which the present invention may be used includes a pair of reels 1 and 2 upon which a magnetic tape 10 is wound. The reels 1 and 2 are rigidly mounted relative to one another by means not shown. The tape 10 is driven past a magnetic recording head 3 by a tape drive arrangement 4. The magnetic head 3 is capable of writing information on the tape 10 and reading information therefrom in accordance with appropriate commands received either from a central data processor, not shown, or from an operator. The tape drive arrangement 4 includes a tape drive capstan 5, the surface of which is in frictional contact with the tape 10 for driving the tape between the reels 1 and 2 and past the head 3. The capstan 5 is in turn driven by a control system 6. The tape path includes low inertia storage areas 7 and 8 illustrated as columns in which tape loops are formed by vacuum means, not shown. Guides 9 serve to guide the tape 10 into and out of the columns 7 and 8. Further guide means 11 serve to guide the tape in the vicinity of the recording head 3 and the tape drive capstan 5. The guide means 9 and 11 and the capstan 5 are also rigidly mounted relative to each other and to the reels 1 and 2.

The control system 6 is operative to rotate the capstan 5 in either a clockwise or counterclockwise direction. When the capstan rotates in a clockwise direction, its tape engaging surface translates the tape 10 from the reel 2 to the reel 1. When the capstan rotates in a counterclockwise direction, its tape engaging surface translates the tape 10 from the reel 1 to the reel 2. For purposes of illustration, the counterclockwise rotation of the capstan is assumed to be the forward direction; and clockwise rotation, the reverse direction.

Figure 2:
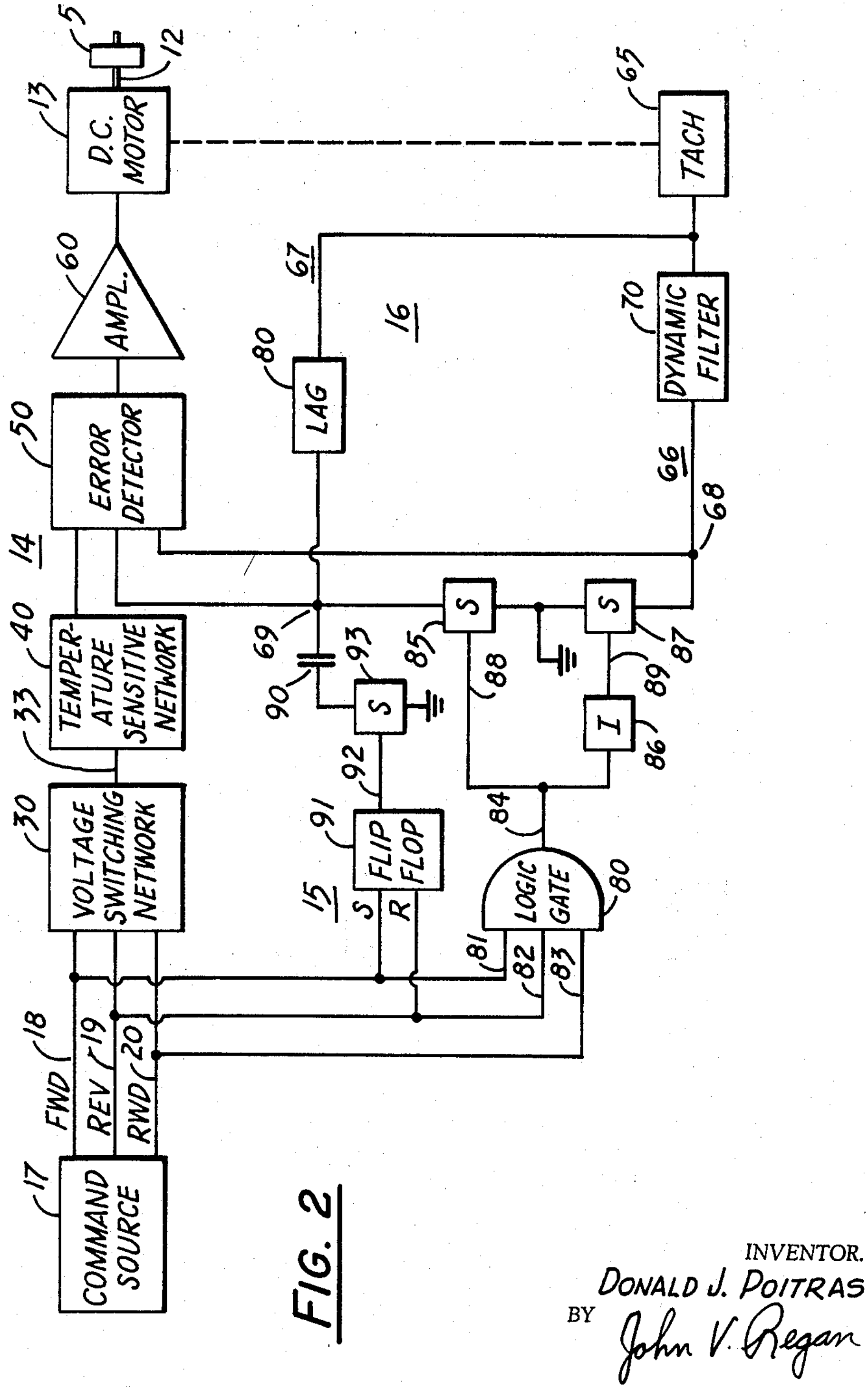
FIG. 2 is a block diagram of a control system in accordance with the invention.

For a more detailed description of the control system 6, refer now to FIG. 2 wherein the capstan 5 is mechanically coupled to the output shaft 12 of a D.C. motor 13. The D.C. motor 13 is reversible and preferably of the printed circuit type wherein the armature consists of a disc with printed wiring thereon which serves the function of the armature winding. The D.C. motor 13 is associated with a control arrangement 14, a switching circuit 15 and a command source 17. The control arrangement 14 includes a feedback circuit 16 for developing a velocity voltage for controlling the D.C. motor 13.

The command source 17 may be associated with, or be part of, a central data processor with which the tape station is utilized. The command source 17 develops logical command voltage levels at its outputs 18, 19 and 20 indicative of FORWARD, REVERSE and REWIND tape operations, respectively. For the rest condition, that is no tape motion, the outputs 18, 19 and 20 are all at one of two digital voltage levels, say the higher level. When the tape is to be accelerated in the forward direction, the output 18 changes abruptly from the higher to the lower level; while the outputs 19 and 20 remain at the higher level. Likewise, when the tape is to be accelerated in the reverse direction, the output 19 changes abruptly from the higher to the lower level; while the outputs 18 and 20 remain at the higher level. To decelerate the tape to the rest condition, the output 18 or 19 which is at the lower level is returned to the higher level. To reverse the direction of tape movement, the output 18 or 19 which is at the lower level changes to the higher level; while the other output simultaneously changes to the lower level. To rewind the tape, the REVERSE and REWIND outputs 19 and 20 change to the lower level; while the output 18 is at the higher level.

The control arrangement 14 includes a voltage switching network 30, a temperature sensitive network 40, an error detector 50 and an amplifying system 60 connected in the named sequence between the command source 17 and the D.C. motor 13. The voltage switching network 30 converts the digital signals of the command source FORWARD and REVERSE outputs 18 and 19 into forward or reverse signals of either one polarity or the other, say negative and positive, respectively, and preferably of the same magnitude. The network 30 converts the REWIND output 20 of the command source into a rewind signal of one of the two polarities, say positive, having a magnitude larger than the forward or reverse signals.

Figure 3:
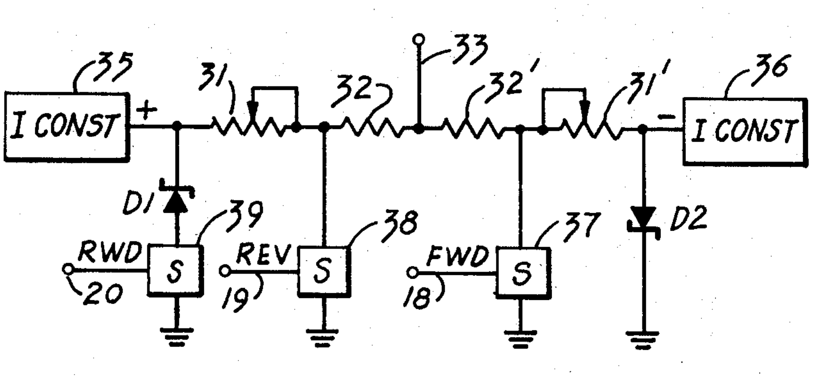
FIG. 3 is a circuit diagram of the voltage switching network of the system illustrated in FIG. 2.

The voltage switching network 30 may take the form of the circuit illustrated in FIG. 3 wherein a voltage divider arrangement of resistances 31, 32, 32' and 31' is series connected in the named sequence between conventional type constant current devices 35 and 36. Constant current device 35 is further connected via a reference Zener diode D1 and an electronic switch 39 to ground; while constant current source 36 is further connected via reference diode D2 to ground. The junction of resistances 32 and 32' is connected to an output 33. The junction of resistances 31 and 32 is connected via the switching path of electronic switch 38 to ground. The junction of resistances 32' and 31' is connected via the switching path of electronic switch 37 to ground. The control electrodes of electronic switches 37, 38 and 39 are connected to the command outputs 18, 19 and 20, respectively.

When all of the command outputs are at the higher digital level, each of the switches 37, 38 and 39 is closed. The current generated by constant current device 35 divides between the Zener diode D1 and resistance 31 to ground through the closed switch 38. The current generated by constant current device 36 divides between the Zener diode D2 and the resistance 31' to ground through closed switch 37. Thus, the output 33 provides zero signal for this condition.

When the forward command output 18 changes to the lower level, the switch 37 opens. Current now flows in the circuit of the constant current source 36; resistances 31', 32', and 32, electronic switch 38 and ground. The output 33 provides a forward signal determined by the current flow through resistance 32.

When the reverse command output 19 changes to the lower digital level, switch 38 opens. Current now flows in the circuit of constant current source 35; resistances 31, 32 and 32'; electronic switch 37 and ground. The output 33 provides a reverse signal determined by the current flow through resistance 32'. In order that the reverse signal be of a different polarity than the forward signal, the constant current devices 35 and 36 are illustrated as having the polarities indicated in FIG. 3.

When a REWIND command occurs, both the REVERSE and REWIND outputs 19 and 20 change to the lower digital levels. Electronic switches 38 and 39 open. Substantially all of the current from constant current source 35 now flows in the circuit with resistances 31, 32 and 32'; the closed switch 37 and ground. The output 33 now provides a rewind signal determined by the current flow in resistance 32'. The rewind signal is greater in magnitude than the reverse signal since more current is flowing in resistance 32'.

The temperature sensitive network 40 contains a transistor arrangement for introducing a temperature variation into the drive signal. The temperature sensitive network, shown in detail in FIG. 6, will be described in detail hereinafter. The error detector 50 compares the drive signal with a feedback signal developed by feedback circuit 16 to generate an error signal which is amplified by the amplifier system 60 and applied to the armature of the motor 13. The amplifier system 60 may be any conventional type capable of amplifying error signals of either polarity such as the one disclosed in my copending application entitled AMPLIFIER, U.S. Ser. No. 481,284, and filed concurrently herewith.

The feedback circuit 16 includes a tachometer 65 mounted on the output shaft 12 of the D.C. motor 13 as indicated by the dotted line in FIG. 2. The tachometer 65 develops a velocity signal proportional to the speed of the motor 13. The velocity signal has an A.C. ripple component which is also proportional to the speed of the motor. The velocity signal is applied by way of separate circuit branches 66 and 67 to the error detector 50. Circuit branch 66 includes a dynamic filter network 70 for filtering the A.C. ripple component from the velocity signal. The dynamic filter circuit includes a transistor circuit arrangement which is connected between the tachometer and the capacitance and resistance network of the filter in order to minimize the resistance of the charging circuit for the capacitance, thereby minimizing the time constant of the filter network. The filter network 70 also normally functions as a lag network. The circuit branch 67 also includes a lag network 80 which has a time constant substantially larger than the time constant of the dynamic filter circuit 70. The lag network 80 may be any conventional type such as the simple resistance and shunt capacitance as illustrated in FIG. 5.

The switching circuit 15 includes a logic gate 80 having three inputs 81, 82 and 83 connected to the command source outputs 18, 19 and 20, respectively, and an output 84. The output 84 is directly connected to the control electrode 88 of an electronic switch 85 and by way of an inverter 86 to the control electrode 89 of another electronic switch 87. The electronic switch 85 has its switching path connected between the circuit point 69 and a point of fixed reference potential, illustrated by the conventional ground symbol in FIG. 2. The electronic switch 87 has its switching path connected between the circuit point 68 and the ground reference.

The logic gate 80 has a truth table as illustrated in FIG. 4 such that whenever any one of the inputs 81, 82 or 83 is at the lower level L, the output 84 is at the higher level H; and only when all the inputs 81, 82 and 83 are at the higher level H, is the output 84 at the lower level L. If the binary symbols "1" and "0" are assigned to the higher and lower levels, respectively, the gate can be said to function as a NAND gate. On the other hand, if the binary symbols "1" and "0" are assigned to the lower and higher levels, respectively, the gate can be said to function as a NOR gate. The logic gate 80 may be any conventional gate having a truth table as illustrated in FIG. 4.

The electronic switches 85 and 87 respond to the output 84 such that electronic switch 85 is closed and switch 87 is open when the output 84 is at the higher voltage level. On the other hand, when the output 84 is at the lower voltage level, the switch 85 is opened and the switch 87 is closed.

Consider now the operation of the control system of FIG. 2. When the tape 10 is stationary, the capstan 5 and the D.C. motor 13 are in a rest condition of no rotation. The outputs 18, 19 and 20 are all at the higher voltage level and the voltage network 30 generates no drive signal at this time. With the D.C. motor at a standstill, no feedback velocity signal is developed by the tachometer. The logic gate output 84 is at the lower voltage level so that electronic switch 85 is open and switch 87 is closed. Thus, the circuit branch 67 and the lag network 80 are connected in the feedback circuit 16, while the circuit branch 66 and the dynamic filter 70 are shorted to ground.

When it is desired to drive the tape 10 in the aforementioned forward direction, the command source output 18 abruptly changes to the lower voltage level. The voltage switching network 30 converts this abrupt change in voltage level to a forward signal which is applied by way of the temperature sensitive network 40 to the error detector 50. The error detector develops an error signal which is substantially equal to the forward signal and applies it to the amplifying system 60. The error signal amplitude at this time is large enough to cause the amplifying system 60 to operate in a nonlinear range to provide a substantially constant overdrive signal to the armature of the motor 13. As the motor 13 begins to accelerate in the forward direction, the tachometer 65 develops a feedback velocity signal which is applied to the circuit branches 66 and 67.

When the forward output 18 abruptly changes from the high level to the low level, the logic gate 80 responds to open switch 87 and to close switch 85. Consequently, the circuit branch 67 is shorted to ground and the operation of the lag network 80 is inhibited when the motor 13 accelerates in the forward direction from the rest condition. With switch 85 closed, switch 87 is open so that the circuit branch 66 is connected in the feedback circuit 16. The dynamic filter circuit 70 is therefore operative to filter the A.C. ripple component from the velocity signal with a minimum time delay resulting in only a slight phase lag of the velocity signal. Consequently, the error voltage developed by the error detector 50 very closely follows the velocity of the motor 13 and rapidly approaches a steady state error signal. The overdrive signal developed by the amplifying system 60 remains constant until the error signal decreases sufficiently to operate the system in a linear range. When this happens, the drive signal applied to the motor linearly approaches the steady state condition.

When it is desired to accelerate the tape in the reverse direction, the REVERSE output 19 abruptly changes from the higher to the lower voltage level. The voltage switching network 30 converts this abrupt change in level to a reverse signal; and the arrangement 14 responds thereto to accelerate the motor 13 in the reverse direction. The switching circuit 15 responds to the abrupt level change of the REVERSE output 19 in the same manner as it responded to the FORWARD output 18 to close switch 85 and open switch 87 so that circuit branch 66 is connected in the feedback circuit 16 while circuit branch 67 is shorted to ground.

The REWIND operation is similar to the REVERSE operation except that the voltage switching network 30 responds to changes in level of both the REVERSE and REWIND outputs 19 and 20 to provide a larger magnitude rewind signal in order to drive the motor at more rapid speeds. The circuit branch 66 with its short time constant dynamic filter circuit 70 is also connected in the feedback circuit 16 for this operation.

When motor 13 decelerates to the rest condition from rotation in either the forward or reverse direction, the drive signal developed by the voltage switching network 30 becomes zero. The error signal becomes equal to the feedback velocity signal in both magniture and polarity, the polarity being such as to aid in turning the motor off. The amplitude of this error signal is large enough to cause the amplifying system 60 to operate in a nonlinear range to provide a substantially constant overdrive signal of a polarity which aids in turning the motor off. As the motor 13 slows down, the error signal decreases in magnitude. However, the overdrive signal remains constant until the error signal decreases sufficiently to operate the amplifying system in a linear range. When this happens, the drive signal magnitude decreases linearly in the same manner as the error signal decreases. As the error signal magnitude decreases below the threshold of the amplifying system 60 into its dead zone, the amplifier cuts off and the drive signal falls to zero. When this happens, the motor 13 must then coast or slow down to zero speed on its own accord resulting in long return to zero transients.

In the present invention, the switching circuit 15 responds to the turn-off or return to zero command of command source 17 to connect circuit branch 67 with its relatively long time constant into the feedback circuit 16 to thereby delay the decrease in magnitude of the error signal. For this turn-off command, all of the command outputs 18, 19 and 20 are at the higher of the two digital levels so that the logic gate output 84 is at the lower level. Electronic switch 85 opens and electronic switch 87 closes to short circuit branch 66 to ground. Consequently, the lag network 80 is operative to delay the feedback velocity signal and therefore the error signal from rapidly decreasing in magnitude and from passing into the dead zone of the amplifier system 60.

The invention provides a further means in order to accommodate differing loading on the motor during the turn-off transients in different directions. In FIG. 1, for example, the recording head 3 being on one side only of the capstan 5 presents different loading when the capstan pulls (counterclockwise reverse rotation) the tape past the head than when pushing (clockwise forward rotation) the tape past the head.

The further means is illustrated as a capacitance 90 which is connected in parallel with the capacitance C of the lag network 80 (FIGS. 2 and 5) by the switching circuit 15 during the return to zero transient from rotation in the forward direction. To this end, switching circuit 15 includes a conventional SET-RESET flip-flop 91 having a pair of inputs S and R connected to the command source outputs 18 and 19 respectively. Although the flip-flop 91 may have complementary outputs, only one output 92 is connected to the control electrode of an electronic switch 93 which has its switching path connected in series with capacitance 90 between circuit point 69 and ground.

The flip-flop 91 responds to changes in digital signal level of the FORWARD command output 18 to set the flip-flop and provide an appropriate signal level at its output 92 for closing switch 93. When switch 93 closes, capacitance 90 is connected in parallel with the capacitance C of the lag network 80 as aforementioned. However, this parallel combination is shorted to ground by switch 85 during the acceleration of the motor 13 as described above. It is only when switch 85 opens during the turnoff of the motor that the additional capacitance 90 is connected in parallel with the capacitance C of the lag network 80. This connection is operative to increase the time constant of the lag in the circuit branch 67 during the return to zero transient of rotation in the forward direction.

Another mode of operation of which the system of FIG. 2 is capable is that of reversal of rotation. For this type of operation, one of the FORWARD or REVERSE command outputs 18 or 19 is initially at the lower digital level so that the motor is rotating in the corresponding direction. For a reversal, the command output 18 or 19 which is at the lower level changes abruptly to the higher level while the other of the two command outputs changes abruptly to the lower level. Since one of these two outputs is always at the lower level before, during and after this operation, the logic gate output 84 remains at its higher level; and switch 85 continues to short circuit branch 67 to ground. Thus, circuit branch 66 remains in the feedback circuit for this operation. It is apparent that the longer time constant of the circuit branch 67 is not needed for this operation since the instantaneous reversal of command outputs 18 and 19 generates an instantaneous change in polarity of the drive signal so that the dead zone of the amplifier system 60 is passed through instantaneously.

FIG. 6 shows in detail the temperature sensitive network 40, the error detector 50 and the dynamic filter network 70. The aforementioned transistor arrangement of the dynamic filter 70 includes two opposite conductive type transistors Q3 and Q4 having their base electrodes connected in common to an input 71 which is further connected to the output of the tachometer 65. The emitter electrodes of the two transistors are connected in common to circuit point 72. A capacitance 73 is connected between circuit point 72 and ground. Circuit point 72 is further connected by way of resistance 74 to the circuit point 68. The collector electrodes of transistors Q3 and Q4 are connected to voltage supplies V3 and V4, respectively, which are preferably of the same magnitude but opposite in polarity. For applications where a phase lead is desirable, a capacitance 75 illustrated by the dashed connections is connected across the resistance 74.

When the tachometer output is zero corresponding to the rest condition of the motor 13, neither transistor Q3 nor Q4 is conductive. When the velocity signal goes positive, transistor Q3 becomes conductive to rapidly charge the capacitance 73. Transistor Q4 remains cut off at this time. The effective resistance of the charging circuit is that of the tachometer output divided by the current amplification factor of the transistor Q3. Likewise, transistor Q4 conducts and transistor Q3 cuts off in response to negative going velocity signals to rapidly charge capacitance 73 in the opposite direction. Since the current amplification factors of the transistors are relatively large, the effective charging resistance is very small. Thus, the charge time constant is quite small so that a minimum delay is provided.

Although the transistor arrangement of Q3 and K4 is advantageous to shorten the time constant of the filter, it is also disadvantageous in that it is sensitive to changes in temperature. For example, the current amplification factors of transistors Q3 and Q4 vary with temperature such that the feedback velocity signal magnitude also varies. In order to compensate for these undesirable temperature fluctuations, temperature sensitive network 40 is connected between the voltage switching network 30 and the error detector 50. The temperature sensitive network 40 includes two opposite-conductively type transistors Q1 and Q2 having their base electrodes connecetd in common to an input 41 which is further connected to the output of the voltage switching network 30. The collector electrodes of transistors Q1 and Q2 are respectively connected to the voltage supplies V1 and V2, preferably of the same value and opposite in size. Moreover, voltage supply V1 may be the same as supply V3; and supply V2 may be the same as supply V4. The emitter electrodes of transistors Q1 and Q2 are connected in common to circuit point 42 and ground. Circuit point 42 is further connected to an output 44.

When no signal is applied to input 41 neither transistor Q1 nor Q2 conducts. When a reverse positive signal is applied to input 41, transistor Q1 conducts while transistor Q2 remains cut off. On the other hand, when a forward negative signal is applied to input 41, transistor Q2 conducts and transistor Q1 cuts off. It is apparent that the transistor arrangement of Q1 and Q2 affects the drive signal for temperature variations in the same manner as the transistor arrangement of Q3 and Q4 in the dynamic filter 70 affects the velocity signal.

The output 44 of the temperature sensitive network 40 is connected to the input 51 of the error detector 50. The dynamic filter 70 is connected to an input 53 of the error detector. The third input 52 is connected to circuit point 69 in FIG. 2. Error detector 50 includes resistances 54, 55 and 56 connected between inputs 51, 52 and 53, respectively, and a summing node 57. The summing node 57 is further connected to an output 58. The error detector 50 responds to the drive signal from the temperature sensitive network 40 and the feedback velocity signal from the filter 70 to provide the resultant sum of the two signals. Whenever the polarity of the feedback signal differs from the polarity of the drive signal, the variations of the two signals due to temperature variations are substantially cancelled in the error detector 50. Thus, the error signal or the resultant sum of the forward or reverse input signal and the feedback velocity signal is substantially independent of temperature variations.

There has been described an improved drive arrangement for a tape capstan. As aforementioned, the command source 17 makes rigorous demands on the motor 13 in that the turn-on, turn-off and reversal operations occur at rates up to fifty operations per second for relatively long periods of time. Since the motor 13 is a printed circuit type, it may become overheated so that the printed circuit armature burns up and large amounts of power are expended during the above-mentioned transients. For this reason, the motor drive arrangement is preferably operated with a substantially critically damped response. The use of the dynamic filter 70 has enabled the drive arrangement to accelerate the capstan from the rest condition to a steady state speed of 720 r.p.m. in five milliseconds. For a two-inch diameter capstan, this corresponds to a tape acceleration from the rest condition to 75 inches per second in five milliseconds. The switching of the relatively larger time constant lag circuit 80 into the feedback circuit 16 during the turn-off transient has enabled the capstan to decelerate from 720 r.p.m. to the rest condition in about four milliseconds with a substantially damped response.

What is claimed is:

1. A switching circuit in combination with a source of command signals and a D.C. motor control arrangement having a feedback circuit including first and second lag networks, said D.C. motor responding to said command signals to accelerate in any of two directions from a rest condition, to decelerate from rotation in any of said two directions to said rest condition, and to reverse its rotation from one to the other of said two directions, said switching circuit comprising,
means responsive to said command signals for inhibiting the operation of said second lag network when said motor accelerates and for inhibiting the operation of said first lag network when said motor decelerates to said rest condition.

2. A switching circuit in combination with a source of command signals and a D.C. motor control arrangement having a feedback circuit including first and second lag networks, said D.C. motor responding to said command signals to accelerate in any of two directions from a rest condition, to decelerate from rotation in any of said two directions to said rest condition, and to reverse its rotation from one to the other of said two directions, said switching circuit comprising,
gating means responsive to said command signals for developing control signals,
first means responsive to said control signals for inhibiting the operation of said second lag network when said motor accelerates, and
second means responsive to said control signals for inhibiting the operation of said first lag network when said motor decelerates to said rest condition.

3. A switching circuit in combination with a source for generating a plurality of bilevel command signals and a D.C. motor control arrangement having a feedback circuit including first and second lag networks, said D.C. motor responding to said command signals to accelerate in any of two directions from a rest condition, to decelerate from rotation in any of said two directions to said rest condition, and to reverse its rotation from one to the other of said two directions, said switching circuit comprising,
gating means responsive to said plurality of command signals being at one of said levels for developing a first control signal and responsive to any one of said plurality of command signals being at the other of said levels for developing a second control signal,
first switch means responsive to said first control signal for connecting said first lag network to a point of fixed reference potential, and
second switch means responsive to said second control signal for connecting said second lag network to said fixed reference potential.

4. A feedback circuit in combination with a D.C. motor drive arrangement which includes a source of input signal levels, an error signal detector and said D.C. motor connected in series in the named sequence, said feedback circuit comprising,
a tachometer coupled to the output shaft of said motor for developing a velocity voltage having a ripple component,
a filter circuit for filtering said ripple component including a resistance and a filter capacitance having one plate thereof connected to a point of fixed potential,
impedance transformation means coupled between the output of said tachometer and the other plate of said filter capacitance, said impedance transformation means including a transistor arrangement having a base lead connected to the tachometer output and an emitter lead connected to the other plate of said filter capacitance, the effective charging resistance of said filter capacitor being the output resistance of the tachometer divided by the current amplification factor of the transistor arrangement, and
means including said resistance for coupling said other plate of said capacitance to said error detector.

5. The invention as claimed in claim 6 wherein said further transistor arrangement is connected between said drive signal source and said error detector.

6. The invention according to claim 4
wherein a further transistor arrangement identical to said first named transistor arrangement is provided for compensating for temperature variations of said current amplification factor.

7. The invention according to claim 4
wherein said transistor arrangement includes a pair of opposite conductivity type transistors each having a base electrode connected to said base lead and an emitter electrode connected to said emitter lead and a collector electrode connected to operating voltage terminal means.

8. The invention according to claim 7
wherein a further transistor arrangement identical to said first named transistor arrangement is provided for compensating for temperature variations of said current amplification factor, the base lead of said further transistor arrangement being coupled to receive said command signals and the emitter lead of said further transistor arrangement being coupled to said error detector.

9. The combination comprising,
a source of command signals, an error signal detector and a D.C. motor series coupled in the named sequence, said D.C. motor responding to said command signals to accelerate in any of two directions from a rest condition, to decelerate from rotation in any of said two directions to said rest condition, and to reverse its rotation from one to the other of said two directions,
a tachometer coupled to the output shaft of said motor for developing a velocity signal,
lag circuit means coupled between said tachometer and said error signal detector for translating said velocity signal, said lag circuit means being variable between relatively large and relatively small signal translation delays, and
means responsive to said command signals for varying said lag circuit means to said smaller delay when said motor accelerates and to said larger delay when said motor decelerates to said rest condition.

10. The combination comprising,
a source of command signals, an error signal detector and a D.C. motor series coupled in the named sequence, said D.C. motor responding to said command signals to accelerate in any of two directions from a rest condition, to decelerate from rotation in any of said two directions to said rest condition, and to reverse its rotation from one to the other of said two directions,
a tachometer coupled to the output shaft of said motor for developing a velocity signal,
first and second lag circuit branches separately coupled between said tachometer and said error signal detector for translating said velocity signal, said first lag circuit having a time constant substantially larger than the time constant of said second lag circuit, and
a switching circuit responsive to said command signals for inhibiting the operation of said first lag circuit branch when said motor accelerates and for inhibiting said second lag circuit branch when said motor decelerates to said rest condition.

11. The combination comprising,
a source of command signals, an error signal detector and a D.C. motor series coupled in the named sequence, said D.C. motor responding to said command signals to accelerate in any of two directions from a rest condition, to decelerate from rotation in any of said two directions to said rest condition, and to reverse its rotation from one to the other of said two directions, a tachometer coupled to the output shaft of said motor for developing a velocity signal having a ripple component, first and second lag circuit branches separately coupled between said tachometer and said error signal detector for translating said velocity signal, said first lag circuit branch including a transistor arrangement and a capacitance, said transistor arrangement being coupled between said tachometer and said capacitance, the effective charging resistance of said capacitance being the output resistance of said tachometer divided by the current amplification factor of said transistor arrangement so that the time constant of said first circuit branch is relatively short, said second lag circuit having a time constant substantially longer than the time constant of said first lag circuit, and a switching circuit responsive to said command signals for inhibiting the operation of said first lag circuit branch when said motor accelerates and for inhibiting the operation of said second lag circuit branch when said motor decelerates to said rest condition.

12. The combination comprising, a source of command signals, an error signal detector and a D.C. motor series coupled in the named sequence, said D.C. motor responding to said command signals to accelerate in any of two directions from a rest condition, to decelerate from rotation in any of said two directions to said rest condition, and to reverse its rotation from one to the other of said two directions, a tachometer coupled to the output shaft of said motor for developing a velocity signal having a ripple component, first and second lag circuit branches separately coupled between said tachometer and said error signal detector for translating said velocity signal, said first lag circuit branch including a transistor arrangement and a capacitance, said transistor arrangement being coupled between said tachometer and said capacitance, the effective charging resistance of said capacitance being the output resistance of said tachometer divided by the current amplification factor of said transistor arrangement so that the time constant of said first circuit branch is relatively short, said second lag circuit having a time constant substantially longer than the time constant of said first lag circuit, and gating means responsive to said command signals for developing control signals, first means responsive to said control signals for inhibiting the operation of said second lag network when said motor accelerates, and second means responsive to said control signals for inhibiting the operation of said first lag network when said motor decelerates to said rest condition.

13. The combination comprising, a source for generating a plurality of bilevel command signals, an error signal detector and a D.C. motor series coupled in the named sequence, said D.C. motor responding to said command signals to accelerate in any of two directions from a rest condition, to decelerate from rotation in any of said two directions to said rest condition, and to reverse its rotation from one to the other of said two directions, a tachometer coupled to the output shaft of said motor for developing a velocity signal having a ripple component, first and second lag circuit branches separately coupled between said tachometer and said error signal detector for translating said velocity signal, said first lag circuit branch including a transistor arrangement and a capacitance, said transistor arrangement being coupled between said tachometer and said capacitance, the effective charging resistance of said capacitance being the output resistance of said tachometer divided by the current amplification factor of said transistor arrangement so that the time constant of said first circuit branch is relatively short, said second lag circuit having a time constant substantially longer than the time constant of said first lag circuit, gating means responsive to said plurality of signals being at one of said levels for developing a first control signal and responsive to any one of said plurality of command signals being at the other of said levels for developing a second control signal, first switch means responsive to said first control signal for connecting said first lag network to a point of fixed reference potential, and second switch means responsive to said second control signal for connecting said second lag network to said fixed reference potential.

14. A switching circuit in combination with a source of command signals and a D.C. motor control arrangement having a feedback circuit including first and second lag networks, said D.C. motor responding to said command signals to accelerate in any of two directions from a rest condition, to decelerate from rotation in any of said two directions to said rest condition, and to reverse its rotation from one to the other of said two directions, said switching circuit comprising, means responsive to said command signals for inhibiting the operation of said second lag network when said motor accelerates and for inhibiting the operation of said first lag network when said motor decelerates to said rest condition, and means responsive to said command signals for increasing the lag of said first lag network when said motor decelerates to said rest condition from rotation in one only of said directions.

15. A switching circuit in combination with a source of command signals and a D.C. motor control arrangement having a feedback circuit including first and second lag networks, said D.C. motor responding to said command signals to accelerate in any of two directions from a rest condition, to decelerate from rotation in any of said two directions to said rest condition, and to reverse its rotation from one to the other of said two directions, said switching circuit comprising, gating means responsive to said command signals for developing first control signals, first means responsive to said first control signals for inhibiting the operation of said second lag network when said motor accelerates, second means responsive to said first control signals for inhibiting the operation of said first lag network when said motor decelerates to said rest condition, flip-flop means responsive to said command signals for developing second control signals, and means responsive to said second control signals for increasing the lag of said first lag network when said motor decelerates from rotation in one only of said directions.

16. The combination comprising, a source of command signals, an error signal detector and a D.C. motor series coupled in the named sequence, said D.C. motor responding to said command signals to accelerate in any of two directions from a rest condition, to decelerate from rotation in any of said two directions to said rest condition, and to reverse its rotation from one to the other of said two directions, a tachometer coupled to the output shaft of said motor for developing a velocity signal, first and second lag circuit branches separately coupled between said tachometer and said error signal detector for translating said velocity signal, said first lag circuit having a time constant substantially larger than the time constant of said second lag circuit, and a switching circuit responsive to said command signals for inhibiting the operation of said first lag circuit branch when said motor accelerates, for inhibiting said second lag circuit branch when said motor decelerates to said rest condition, and for increasing the lag of said first lag network when said motor decelerates to said rest condition from rotation in one only of said directions.

References Cited

UNITED STATES PATENTS

| | | | |
|---|---|---|---|
| 2,809,339 | 10/1957 | Guggi | 318—327 |
| 3,026,463 | 3/1962 | Wolke et al. | 318—327 |
| 3,093,776 | 6/1963 | Bird et al. | |
| 3,108,212 | 10/1963 | Nearhoof. | |
| 3,108,214 | 10/1963 | Wilkerson | 318—144 |
| 3,131,342 | 4/1964 | Wilkerson | 318—327 |
| 3,219,900 | 11/1965 | Wilkerson | 318—145 |
| 3,342,999 | 9/1967 | Townsend | 290—40 |

ORIS L. RADER, *Primary Examiner.*

G. SIMMONS, *Assistant Examiner.*